(12) United States Patent
Wright

(10) Patent No.: US 7,765,344 B2
(45) Date of Patent: Jul. 27, 2010

(54) APPARATUS AND METHOD FOR DYNAMICALLY PROVIDING HUB OR HOST OPERATIONS

(75) Inventor: David G. Wright, Escondido, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 11/983,049

(22) Filed: Nov. 6, 2007

(65) Prior Publication Data

US 2008/0140872 A1    Jun. 12, 2008

Related U.S. Application Data

(63) Continuation of application No. 10/260,109, filed on Sep. 27, 2002, now Pat. No. 7,293,118.

(51) Int. Cl.
*G06F 13/12* (2006.01)
*G06F 3/00* (2006.01)
*G06F 13/00* (2006.01)
*G06F 1/00* (2006.01)

(52) U.S. Cl. ............................. 710/62; 710/14; 710/63; 710/64; 710/300; 713/300

(58) Field of Classification Search ........................ None
See application file for complete search history.

(56) References Cited

U.S. PATENT DOCUMENTS

| | | | |
|---|---|---|---|
| 3,800,090 | A | 3/1974 | Matena |
| 3,810,120 | A | 5/1974 | Huettner et al. |
| 3,864,670 | A | 2/1975 | Inoue et al. |
| 3,950,735 | A | 4/1976 | Patel |
| 4,007,449 | A | 2/1977 | Vercesi |
| 4,195,351 | A | 3/1980 | Barner et al. |
| 4,419,723 | A | 12/1983 | Wilson, Jr. |

(Continued)

FOREIGN PATENT DOCUMENTS

JP      01279630 A1    11/1989

(Continued)

OTHER PUBLICATIONS

USPTO Notice at Allowance for U.S. Appl. No. 10/260,109 dated Jun. 19, 2007; 4 pages.

(Continued)

*Primary Examiner*—Alan Chen

(57) ABSTRACT

An apparatus and method for coupling a host computer to one or more peripherals or for coupling peripherals to one another. In one example, the apparatus includes a hub having an upstream port for coupling with the host computer and one or more downstream ports for coupling with the one or more peripherals; and a local host dynamically coupled with the upstream port. In one example, when the host computer is not coupled with the upstream port, the local host communicates with the peripherals; and when the host computer is coupled with the upstream port, the local host disconnects from the upstream port so that the host computer communicates with the peripherals through the hub. In this manner, the apparatus may be used to couple peripherals to a host computer, or when a host computer is not present, the data from the peripherals may be communicated through the local host. Other embodiments are also disclosed.

18 Claims, 4 Drawing Sheets

U.S. PATENT DOCUMENTS

| | | |
|---|---|---|
| 4,445,976 A | 5/1984 | LaDelfa et al. |
| 4,481,625 A | 11/1984 | Roberts et al. |
| 4,626,697 A | 12/1986 | Nelson |
| 4,641,261 A | 2/1987 | Dwyer et al. |
| 4,689,740 A | 8/1987 | Moelands et al. |
| 4,775,807 A | 10/1988 | Bukowski, Jr. |
| 4,862,355 A | 8/1989 | Newman et al. |
| 4,872,107 A | 10/1989 | Marple et al. |
| 5,126,548 A | 6/1992 | Sekiguchi |
| 5,175,451 A | 12/1992 | Ihara |
| 5,230,071 A | 7/1993 | Newman |
| 5,282,166 A | 1/1994 | Ozaki |
| 5,289,580 A | 2/1994 | Latif et al. |
| 5,300,837 A | 4/1994 | Fischer |
| 5,404,480 A | 4/1995 | Suzuki |
| 5,428,748 A | 6/1995 | Davidson et al. |
| 5,434,533 A | 7/1995 | Furutani |
| 5,467,009 A | 11/1995 | McGlinchey |
| 5,471,524 A | 11/1995 | Colvin et al. |
| 5,475,271 A | 12/1995 | Shibasaki et al. |
| 5,483,656 A | 1/1996 | Oprescu et al. |
| 5,488,657 A | 1/1996 | Lynn et al. |
| 5,495,594 A | 2/1996 | MacKenna et al. |
| 5,497,067 A | 3/1996 | Shaw |
| 5,514,859 A | 5/1996 | Seigel |
| 5,522,081 A | 5/1996 | Carls |
| 5,551,044 A | 8/1996 | Shah et al. |
| 5,553,245 A | 9/1996 | Su et al. |
| 5,559,502 A | 9/1996 | Schutte |
| 5,566,296 A | 10/1996 | Ohmori et al. |
| 5,574,859 A | 11/1996 | Yeh |
| 5,577,213 A | 11/1996 | Avery et al. |
| 5,579,531 A | 11/1996 | Sugita |
| 5,586,268 A | 12/1996 | Chen et al. |
| 5,586,271 A | 12/1996 | Parrett |
| 5,590,312 A | 12/1996 | Marisetty |
| 5,598,409 A | 1/1997 | Madonna et al. |
| 5,603,040 A | 2/1997 | Frager et al. |
| 5,606,672 A | 2/1997 | Wade |
| 5,606,704 A | 2/1997 | Pierce et al. |
| 5,610,601 A | 3/1997 | Lahti et al. |
| 5,615,344 A | 3/1997 | Corder |
| 5,628,029 A | 5/1997 | Evoy |
| 5,634,074 A | 5/1997 | Devon et al. |
| 5,655,148 A | 8/1997 | Richman et al. |
| 5,671,355 A | 9/1997 | Collins |
| 5,673,031 A | 9/1997 | Meier |
| 5,675,770 A | 10/1997 | Johansson |
| 5,675,813 A | 10/1997 | Holmdahl |
| 5,687,346 A | 11/1997 | Shinohara |
| 5,689,196 A | 11/1997 | Schutte |
| 5,701,429 A | 12/1997 | Legvold et al. |
| 5,774,013 A | 6/1998 | Groe |
| 5,784,581 A * | 7/1998 | Hannah ........................ 710/110 |
| 5,787,014 A | 7/1998 | Hall et al. |
| 5,790,331 A | 8/1998 | Aranovsky |
| 5,794,032 A | 8/1998 | Leyda |
| 5,794,033 A | 8/1998 | Aldebert et al. |
| 5,796,276 A | 8/1998 | Phillips et al. |
| 5,796,278 A | 8/1998 | Osborn et al. |
| 5,799,196 A | 8/1998 | Flannery |
| 5,802,558 A | 9/1998 | Pierce |
| 5,818,780 A | 10/1998 | Manning |
| 5,838,907 A | 11/1998 | Hansen |
| 5,847,372 A | 12/1998 | Kreft |
| 5,884,086 A | 3/1999 | Amoni et al. |
| 5,898,861 A | 4/1999 | Emerson et al. |
| 5,905,389 A | 5/1999 | Alleven |
| 5,912,569 A | 6/1999 | Alleven |
| 5,922,056 A | 7/1999 | Amell et al. |
| 5,929,664 A | 7/1999 | Alleven |
| 5,931,933 A | 8/1999 | Billheimer et al. |
| 5,937,201 A | 8/1999 | Matsushita et al. |
| 5,938,770 A | 8/1999 | Kim |
| 5,952,733 A | 9/1999 | Johnston |
| 5,963,057 A | 10/1999 | Schmitt et al. |
| 5,982,879 A | 11/1999 | Lucey |
| 6,000,042 A | 12/1999 | Henrie |
| 6,009,034 A | 12/1999 | Manning |
| 6,012,103 A | 1/2000 | Sartore et al. |
| 6,032,178 A | 2/2000 | Bacigalupo et al. |
| 6,038,667 A | 3/2000 | Helbig, Sr. |
| 6,040,714 A | 3/2000 | Klein |
| 6,040,792 A | 3/2000 | Watson et al. |
| 6,049,870 A | 4/2000 | Greaves |
| 6,058,026 A | 5/2000 | Rozman |
| 6,064,554 A | 5/2000 | Kim |
| 6,065,096 A | 5/2000 | Day et al. |
| 6,067,589 A | 5/2000 | Mamata |
| 6,070,211 A | 5/2000 | Neal et al. |
| 6,072,681 A | 6/2000 | Cogan et al. |
| 6,073,193 A | 6/2000 | Yap |
| 6,094,040 A | 7/2000 | Meier et al. |
| 6,101,076 A | 8/2000 | Tsai et al. |
| 6,105,097 A | 8/2000 | Larky et al. |
| 6,124,750 A | 9/2000 | Alleven et al. |
| 6,128,673 A | 10/2000 | Aronson et al. |
| 6,131,134 A | 10/2000 | Huang et al. |
| 6,137,188 A | 10/2000 | Mitchell et al. |
| 6,148,346 A | 11/2000 | Hanson |
| 6,151,645 A | 11/2000 | Young et al. |
| 6,168,077 B1 | 1/2001 | Gray et al. |
| 6,170,062 B1 | 1/2001 | Henrie |
| 6,195,593 B1 | 2/2001 | Nguyen |
| 6,240,522 B1 | 5/2001 | Stufflebeam |
| 6,249,825 B1 | 6/2001 | Sartore et al. |
| 6,266,731 B1 | 7/2001 | Riley et al. |
| 6,311,245 B1 | 10/2001 | Klein |
| 6,311,287 B1 | 10/2001 | Dischler et al. |
| 6,334,160 B1 | 12/2001 | Emmert et al. |
| 6,336,152 B1 | 1/2002 | Richman et al. |
| 6,345,370 B1 | 2/2002 | Kwon |
| 6,389,494 B1 | 5/2002 | Walton et al. |
| 6,389,560 B1 | 5/2002 | Chew |
| 6,393,588 B1 | 5/2002 | Hsu et al. |
| 6,400,715 B1 | 6/2002 | Beaudoin et al. |
| 6,408,351 B1 | 6/2002 | Hamdi et al. |
| 6,415,342 B1 | 7/2002 | Wahl et al. |
| 6,439,464 B1 | 8/2002 | Fruhauf et al. |
| 6,442,734 B1 | 8/2002 | Hanson et al. |
| 6,460,094 B1 | 10/2002 | Hanson et al. |
| 6,493,084 B1 | 12/2002 | Friend et al. |
| 6,502,146 B1 | 12/2002 | Rasmussen et al. |
| 6,502,212 B1 | 12/2002 | Coyle et al. |
| 6,510,532 B1 | 1/2003 | Pelly et al. |
| 6,516,205 B1 * | 2/2003 | Oguma ........................ 455/557 |
| 6,535,938 B1 | 3/2003 | Teramura et al. |
| 6,541,879 B1 | 4/2003 | Wright |
| 6,549,958 B1 * | 4/2003 | Kuba ........................ 710/14 |
| 6,584,519 B1 | 6/2003 | Russell |
| 6,625,761 B1 | 9/2003 | Sartore et al. |
| 6,636,923 B1 * | 10/2003 | Meirsman et al. ........... 710/305 |
| 6,671,831 B1 | 12/2003 | Sartore et al. |
| 6,691,201 B1 | 2/2004 | Williams et al. |
| 6,754,725 B1 | 6/2004 | Wright et al. |
| 6,813,672 B1 | 11/2004 | Kamran et al. |
| 6,820,160 B1 | 11/2004 | Allman |
| 6,839,778 B1 | 1/2005 | Sartore et al. |
| 6,957,284 B2 | 10/2005 | Voth et al. |
| 7,293,118 B1 | 11/2007 | Wright |
| 2002/0124198 A1 * | 9/2002 | Bormann et al. ............ 713/323 |
| 2002/0169915 A1 * | 11/2002 | Wu ........................ 710/305 |
| 2003/0095288 A1 * | 5/2003 | Hung et al. ................. 358/296 |
| 2003/0204661 A1 * | 10/2003 | Uemura ........................ 710/305 |

| | | | |
|---|---|---|---|
| 2003/0214602 | A1* | 11/2003 | Battles et al. ............... 348/375 |
| 2004/0019732 | A1* | 1/2004 | Overtoom et al. ........... 710/313 |

FOREIGN PATENT DOCUMENTS

| | | |
|---|---|---|
| JP | 10-303948 * | 11/1998 |
| JP | 2000-316006 * | 11/2000 |
| WO | WO 96/14305 A1 | 5/1996 |
| WO | WO 97/36230 A1 | 10/1997 |
| WO | WO 98/34376 A1 | 6/1998 |
| WO | WO 99/09712 A1 | 12/1998 |
| WO | WO 99/49415 A1 | 9/1999 |

OTHER PUBLICATIONS

USPTO Non-Final Rejection for U.S. Appl. No. 10/260,109 dated Jan. 23, 2007; 9 pages.
USPTO Final Rejection for U.S. Appl. No. 10/260,109 dated Jun. 13, 2006; 9 pages.
USPTO Non-Final Rejection for U.S. Appl. No. 10/260,109 dated Dec. 20, 2005; 7 pages.
USPTO Final Rejection for U.S. Appl. No. 10/260,109 dated Apr. 5, 2005; 10 pages.
USPTO Final Rejection for U.S. Appl. No. 10/260,109 dated Jul. 20, 2004; 10 pages.
USPTO Non-Final Rejection for U.S. Appl. No. 10/260,109 dated Dec. 24, 2003; 6 pages.
USPTO Notice of Allowance for U.S. Appl. No. 09/592,206 dated May 6, 2003: 7 pages.
USPTO Non-Final Rejection for U.S. Appl. No. 09/592,206 dated Jan. 29, 2003: 8 pages.
USPTO Notice of Allowance for U.S. Appl. No. 09/598,561 dated Oct. 1, 2003: 8 pages.
USPTO Non-Final Rejection for U.S. Appl. No. 09/598,561 dated May 27, 2003; 10 pages.
USPTO Notice of Allowance for U.S. Appl. No. 09/592,201 dated Aug. 11, 2003; 4 pages.
USPTO Final Rejection for U.S. Appl. No. 09/592,201 dated Aug. 20, 2003; 6 pages.
USPTO Non-Final Rejection for U.S. Appl. No. 09/592,201 dated Feb. 3, 2003; 8 pages.
USPTO Notice of Allowance for U.S. Appl. No. 09/590,931 dated Aug. 18, 2004; 4 pages.
USPTO Non-Final Rejection for U.S. Appl. No. 09/590,831 dated Jan. 8, 2004; 6 pages.
USPTO Advisory Action for U.S. Appl. No. 09/590,831 dated Aug. 19, 2003; 3 pages.
USPTO Final Rejection for U.S. Appl. No. 09/590,831 dated Apr. 24, 2003; 11 pages.
USPTO Non-Final Rejection for U.S. Appl. No. 09/590,831 dated Feb. 12, 2003; 9 pages.
USPTO Notice of Allowance for U.S. Appl. No. 09/791,355 dated May 26, 2004; 4 pages.
USPTO Non-Final Rejection for U.S. Appl. No. 09/791,355 dated Feb. 12 2004; 9 pages.
USPTO Non-Final Rejection for U.S. Appl. No. 09/791,355 dated Nov. 6, 2003; 10 pages.
USPTO Notice of Allowance for U.S. Appl. No. 09/816,963 dated Nov. 14, 2004; 5 pages.
USPTO Advisory Action for U.S. Appl. No. 09/816,963 dated Aug. 19, 2002; 2 pages.
USPTO Final Rejection for U.S. Appl. No. 09/816,963 dated May 29, 2002; 4 pages.
USPTO Non-Final Rejection for U.S. Appl. No. 09/816,963 dated Dec. 19, 2001; 7 pages.
USPTO Notice of Allowance for U.S. Appl. No. 08/839,981 dated Nov. 9, 1999; 4 pages.
USPTO Non-Final Rejection for U.S. Appl. No. 08/839,981 dated Jun. 9, 1999; 6 pages.
USPTO Non-Final Rejection for U.S. Appl. No. 08/839,981 dated Nov. 4, 1998; 6 pages.
USPTO Non-Final Rejection for U.S. Appl. No. 08/839,981 dated May 28, 1998; 7 pages.
USPTO Notice of Allowance for U.S. Appl. No. 08/934,933 dated Dec. 21, 1998; 5 pages.
USPTO Non-Final Rejection for U.S. Appl. No. 08/934,933 dated Sep. 16, 1998; 6 pages.
USPTO Notice of Allowance for U.S. Appl. No. 08/934,805 dated Dec. 21, 1998; 3 pages.
USPTO Non-Final Rejection for U.S. Appl. No. 08/934,805 dated Sep. 23, 1998; 6 pages.
USPTO Notice of Allowance for U.S. Appl. No. 08/935,350 dated Jan. 11, 1999; 6 pages.
USPTO Non-Final Rejection for U.S. Appl. No. 08/935,350 dated Sep. 21, 1998; 10 pages.
USPTO Notice of Allowance for U.S. Appl. No. 08/995,494 dated Oct. 14, 1999; 3 pages.
USPTO Final Rejection for U.S. Appl. No. 08/995,494 dated Jul. 12, 1999; 7 pages.
USPTO Non-Final Rejection for U.S. Appl. No. 08/995,494 dated May 14, 1999; 6 pages.
USPTO Notice of Allowance for U.S. Appl. No. 09/850,468 dated Feb. 20, 2004; 3 pages.
USPTO Non-Final Rejection for U.S. Appl. No. 09/850,468 dated Sep. 4, 2003; 6 pages.
USPTO Notice of Allowance for U.S. Appl. No. 09/935,017 dated Jun. 21, 2004: 6 pages.
USPTO Non-Final Rejection for U.S. Appl. No. 09/935,017 dated Feb. 6, 2004; 6 pages.
IBM Personal System/2 Mouse Technical Reference, Second Edition, Jun. 1989: 36 pages.
U.S. Appl. No. 09/592,201: "Fault Tolerant USB Method and Apparatus," Sartore et al., filed on Jun. 9, 2000; 26 pages.
U.S. Appl. No. 08/934,805: "Methods, Circuits, and Devices for Improving Crossover Performance and/or Monotonicity, and Applications of the Same in a Universal Serial Bus (USB) Low Speed Output Driver," Gary W. Alleven; filed on Sep. 22, 1997; 42 pages.
U.S. Appl. No. 08/935,350: "Methods, Circuits, and Devices for improving Crossover Performance and/or Monotonicity, and Applications of the Same in a Universal Serial Bus (USB) Low Speed Output Driver," Gary W. Alleven: filed on Sep. 22, 1997; 42 pages.
"Design Guide for a Low Speed Buffer for the Universal Serial Bus," Revision 1.1, Dec. 1996, Intel Corporation; pp. 1-29; 33 pages.
Universal Serial Bus Specification, Chapter 7—Electrical, Version 1.0; Jan. 15, 1996, pp. 111-143, 34 pages.
U.S. Appl. No. 08/934,933: "Methods, Circuits, and Devices for Improving Crossover Performance and/or Monotonicity, and Applications of the Same in a Universal Serial Bus (USB) Low Speed Output Driver," Gary W. Alleven; filed on Sep. 22, 1997; 44 pages.
"http://www.silicom.co.il/news/201100usb.htm," Silicom Ltd. Connectivity Solutions; 3 pages.
"http://www.silicom.co.il/news/130801u2es.htm," Silicom Ltd. Connectivity Solutions; 3 pages.
Chikamura et al., "An Intellegent IEEE 1394 Hub Architecture," 2002; 2 pages (abstract only).
Schweitzer et al., "Improved Sensitivity and Security for Distribution and Feeder Relays," May 1993; 1 pages (abstact only).
Universal Serial Bus (USB), Device Class Definition for Human Interface Device (HID), Version 1.1, Apr. 7, 1999, pp. 1-87; 94 pages.
International Search Report for International Application No. PCT/EP99/02051 dated Sep. 27, 1999; 3 pages.
International Search Report from the International Searching Authority for International Application No. PCT/US97/04032 dated Jul. 11, 1997; 3 pages.
International Search Report for International Application No. PCT/IB98/02059 mailed Oct. 7, 1999; 3 pages.
International Search Report for International Application No. PCT/EP95/04154 mailed Dec. 28, 1995; 3 pages.
International Search Report for International Application No. PCT/IB98/00041 mailed Jul. 31, 1998; 2 pages.
Universal Serial Bus Specification, Revision 1.1, Sep. 23, 1998, 311 pages.
Universal Serial Bus Specification, Revision 2.0. Apr. 27, 2000; 622 pages.

* cited by examiner

APPARATUS AND METHOD FOR DYNAMICALLY PROVIDING HUB OR HOST OPERATIONS

CROSS REFERENCE

This application is a continuation of U.S. application Ser. No. 10/260,109, filed Sep. 27, 2002, which has matured into U.S. Pat. No. 7,293,118 and will issue on Nov. 6, 2007.

TECHNICAL FIELD

This application relates, in general, to USB devices including hosts, hubs, and peripherals.

BACKGROUND

The universal serial bus (USB) provides a low cost solution for attaching peripheral devices to a host, such as a host computer (i.e., personal computer such as a laptop or desktop or other host) or host server, so that the peripheral devices and the host can communicate with each other. Devices that are attached to a USB bus are automatically detected and software automatically configures the devices for immediate use, typically without user intervention. The USB devices/peripherals may include devices such as printers, scanners, keyboards, a mouse, digital cameras, digital video cameras, data acquisition devices, modems, speakers, telephones or video phones, storage devices such as ZIP drives, or other peripherals or devices.

Typically, a USB bus may include a host computer connected by a USB cable to one or more peripherals/devices or hubs. A USB bus can be extended with a hub which permits additions peripherals, or other hubs, to be coupled to the USB bus. By convention, data transmitted in the direction of the peripheral device is said to be in the "downstream" direction, while data transmitted in the direction of the host computer is said to be in the "upstream" direction.

When multiple peripherals are coupled to a USB bus, each peripheral typically only sees messages or data from the host computer which is intended for the peripheral. For instance, in FIG. 1, a host computer 20, having printing software 21, is coupled with a printer 22 have been a USB printer engine 24 and a flash media card reader 26 coupled the with the host computer 20 through hub of 28. When a flash media card is inserted into reader 26, host computer 20 obtains the data from the reader 26 and effects printer engine 24 to print of one or more images using printing software 21. In this example, printer engine 24 and reader 26 are typically not able to communicate with one another unless host computer 20 is provided, and even in that instance, each peripheral communicates 24, 26 with the host computer 20 and the host computer 20 determines what data should be sent to particular peripherals.

Recently, an extension to the USB specification includes an "on the go" (OTG) feature which permits two USB devices coupled to one another to communicate with one another without the presence of a host computer. FIG. 2 illustrates one example of such a configuration, wherein a USB printer 30 is coupled with a flash media card reader 32 with OTG capabilities, wherein reader 32 may operate as a host in this configuration to control the printer 30. While OTG capabilities of the system of FIG. 2 allows devices 30, 32 to communicate with one another, the configuration of FIG. 2 does not support the dynamic addition of the two devices to a USB bus controlled by a host computer.

Accordingly, as recognized by the present inventor, what is needed is a method and apparatus for USB peripherals to communicate with each other when no host computer is present, or to communicate with a host computer if present.

It is against this background that various embodiments of the present invention were developed.

SUMMARY

According to one broad aspect of one embodiment of the present invention, disclosed herein is an apparatus for coupling a host computer to one or more peripherals. In one example, the apparatus includes a hub having an upstream port for coupling with the host computer and one or more downstream ports for coupling with the one or more peripherals; and a local host dynamically coupled with the upstream port, the local host having a detector for determining whether the host computer is coupled with the upstream port. In one example, when the host computer is not coupled with the upstream port, the local host communicates with the peripherals; and when the host computer is coupled with the upstream port, the local host disconnects from the upstream port so that the host computer communicates with all the peripherals through the hub. In this manner, the apparatus may be used to couple peripherals to a host computer, or when a host computer is not present, the data from the peripherals may be communicated through the local host.

In one embodiment, when the host computer is coupled with the upstream port, the local host may enter a low-power mode. The upstream port may include a Vbus line, and the detector may include a voltage detector detecting a voltage level on the Vbus line. For example, the voltage detector may detect a voltage in the range of approximately 4.35 to 5.25 volts as a condition indicating that the host computer is coupled with the upstream port, and a voltage in the range of approximately 0 volts as a condition indicating that the host computer is not coupled with the upstream port.

In another example, the apparatus may also include a microcontroller coupled with the local host and the hub, the microcontroller for controlling the hub when the host computer is not coupled with the upstream port. The microcontroller may be specially adapted for use with particular peripherals—such as digital cameras and color printers—such that the microcontroller contains operations for facilitating communications between the peripherals when the host computer is not present. In one embodiment, when the host computer is not coupled with the upstream port, the microcontroller performs one or more operations to permit data to be transferred from a first of the one or more peripheral devices to a second of the one or more peripheral devices.

According to another broad aspect of another embodiment of the present invention, disclosed herein is an apparatus for coupling a host computer to one or more peripherals. In one embodiment, the apparatus includes a hub and a local host. The hub may have an upstream port for coupling with the host computer and one or more downstream ports for coupling with the one or more peripherals, the hub determining and indicating whether the host computer is coupled with the upstream port; and the local host may be dynamically coupled with the downstream ports, the local host receiving an indication from the hub whether the host computer is coupled with the upstream port, and when the host computer is not coupled with the upstream port, the local host communicates with the peripherals. The local host may disconnect from the downstream ports when the host computer is coupled with the upstream port, and may also enter a low-power mode in one example. In another example, when the host computer is not coupled with the upstream port, the hub may enter a low-power mode.

In another embodiment, the apparatus may also include a microcontroller coupled with the local host and the hub, the microcontroller for controlling the hub when the host computer is not coupled with the upstream port. The microcontroller may be specially adapted for use with particular peripherals—such as digital cameras and color printers—such that the microcontroller contains operations for facilitating communications between the peripherals when the host computer is not present. In one example, when the host computer is not coupled with the upstream port, the microcontroller performs one or more operations to permit data to be transferred from a first of the one or more peripheral devices to a second of the one or more peripheral devices through the local host.

According to another broad aspect of another embodiment of the present invention, disclosed herein is a method for use with a USB bus adapted for a host computer and one or more peripherals. In one example, the method includes providing a local host, providing a hub coupled with the peripherals, detecting whether the host computer is present on the bus; and if the host computer is present, dynamically configuring the local host so that the host computer communicates with the peripherals through the hub. If the host computer is not present, the local host may be dynamically configured so that the local host communicates with the peripherals through the hub. In one example, if the host computer is present, the local host may be placed in a low-power mode.

The operation of providing a hub may include providing an upstream port for coupling with the host computer and one or more downstream ports for coupling with the peripherals, and the operation of providing a local host may include coupling the local host with the upstream port, so that when the host computer is present, the local host may be disconnected from the upstream port.

In another example, the operation of providing a hub may include providing an upstream port for coupling with the host computer and one or more downstream ports for coupling with the peripherals, and the operation of providing a local host may include coupling the local host with the downstream ports, so that when the host computer is present, the local host is disconnected from the downstream ports. If the host computer is not present, data may be transferred from a first of the one or more peripheral devices to a second of the one or more peripheral devices through the local host.

The foregoing and other features, utilities and advantages of the invention will be apparent from the following more particular description of various embodiments of the invention as illustrated in the accompanying drawings and claims.

DETAILED DESCRIPTION

Disclosed herein is a method and apparatus for coupling a host computer to one or more peripherals or for coupling peripherals to one another. In one example, a local host is provided, a hub is coupled with the peripherals, and it is determined whether the host computer is present on the bus; and if the host computer is present, the local host is dynamically configured so that the host computer communicates with the peripherals through the hub. If the host computer is not present, the local host may be dynamically configured so that the local host communicates with the peripherals through the hub. In this manner, embodiments of the invention may be used to couple peripherals to a host computer, or when a host computer is not present, the data from the peripherals may be communicated through the local host. Various embodiments of the present invention will now be described.

Figure 1:
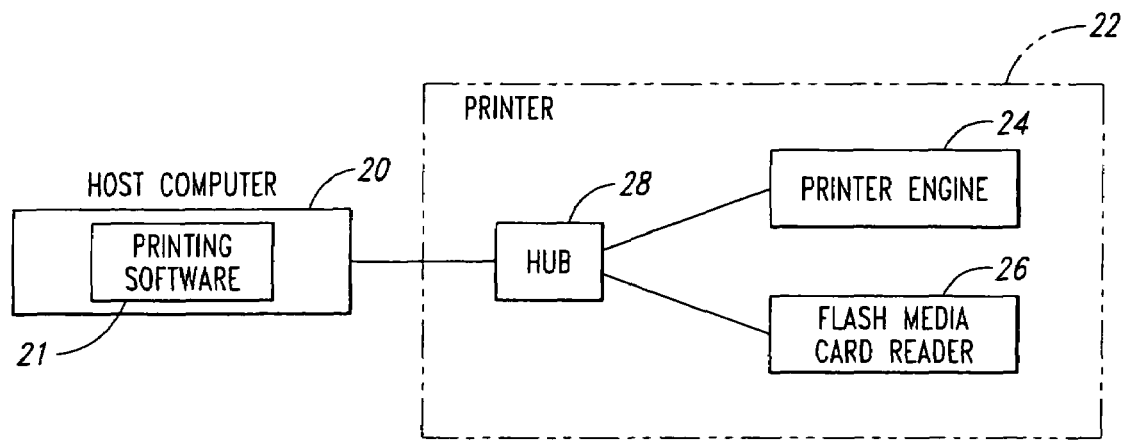
FIG. 1 illustrates a block diagram of a USB bus including a host computer, hub, and printer.
Figure 2:
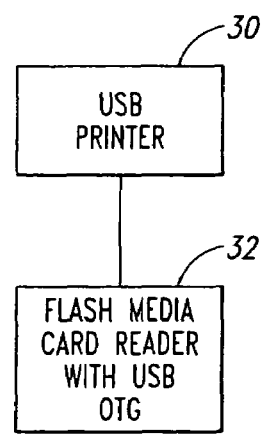
FIG. 2 illustrates a block diagram of a printer coupled with a flash media card reader, both having OTG capabilities.
Figure 3:
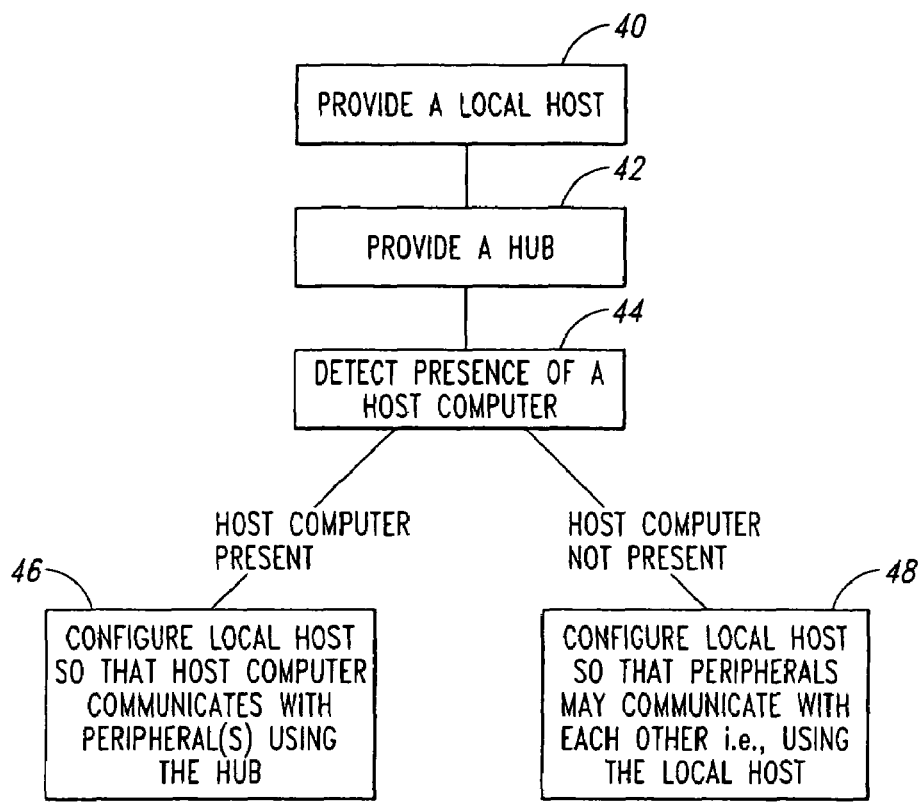
FIG. 3 illustrates an example of logical operations for dynamically providing hub or host capabilities, in accordance with one embodiment of the present invention.

Referring to FIG. 3, one example of logical operations for dynamically providing hub or host capabilities is illustrated in accordance with an embodiment of the present invention. At operation 40, a local host is provided, and at operation 42 a hub is provided. In one embodiment, the hub includes an upstream port adapted to be coupled with a host computer such as a personal computer, laptop computer, desktop computer, or server, and the hub may include one or more downstream ports adapted to be coupled with one or more peripherals. While the term host computer is used throughout this application, it is understood that the present invention could be used with other host devices such as a host server or other types of hosts. In one example, the local host is coupled with the upstream port of the hub; alternatively, the local host may be coupled with the downstream ports of the hub.

At operation 44, a determination is made whether the host computer is coupled with the hub (i.e., whether a host computer is present in the system). In one example, the local host detects the presence of the host computer by examining the state of one or more signal lines of the upstream port of the hub, such as Vbus line wherein a voltage in the range of approximately 4.35 to 5.25 volts indicates that the host computer is coupled with the upstream port, and a voltage in the range of approximately 0 volts indicates that the host computer is not coupled with the upstream port. In another embodiment, a weak pull-up resistor (e.g., 1 M Ohm) is provided on both the signal lines D+ and D− connecting these lines to the bus voltage line Vbus, then if both D+ and D− are high it may be inferred that no host computer is coupled with the hub (since a USB host computer would pull D+ and D− down to 0 volts). In another example, the hub detects the presence of the host computer coupled to the upstream port of the hub, and indicates such presence to the local host.

If the host computer detected to be present by operation 44, then operation 46 configures the local host so that the host computer may communicate with the peripherals using the hub. In one example, where the local host is coupled with the upstream port of the hub, when the host computer is detected by operation 44, the local host disconnects from the upstream port of the hub. Alternatively, where the local host is coupled with the downstream ports of the hub, when the host computer is detected by operation 44, the local host disconnects from the downstream ports of the hub. In this manner, operation 46 permits the host computer to communicate with the peripherals through the hub, and the local host is effectively disconnected from the USB bus.

If, however, the host computer is detected to not be present by operation 44, then operation 48 configures the local host so that the peripherals may communicate with each other through the local host. In this situation, the local host may act as a host for the peripherals (i.e., if the local host is provided with program code to perform one or more operations to act as a host for the peripherals), or the local host may behave as a bridge so as to facilitate "on the go" (OTG) communications between the peripherals. In one example, data from a first peripheral may be made available to a second peripheral through the local host at operation 48. Accordingly, it can be seen that the operations of FIG. 3 permits peripherals to communicate with a host computer or to communicate with each other if a host computer is not present.

Figures 4, 5:
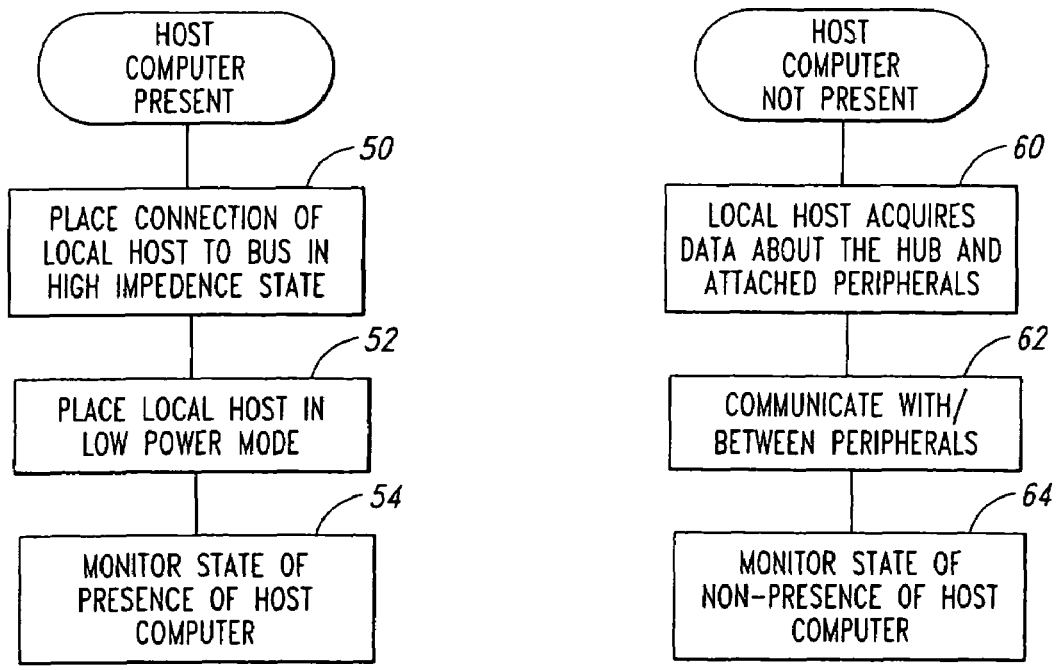
FIG. 4 illustrates an example of logical operations for providing hub capabilities when an external host computer is present, in accordance with one embodiment of the present invention.
FIG. 5 illustrates an example of logical operations for providing host capabilities when an external host computer is not present, in accordance with one embodiment of the present invention.

FIG. 4 illustrates an example of logical operations which may be performed by the local host when a host computer is detected on the USB bus. At operation 50, the connections of the local host to the USB bus are placed in a high impedance state so as to effectively disconnect the local host from the USB bus. Operation 50 thereby allows the host computer to drive and control the USB bus. At operation 52, the local host may be placed in a low-power mode, and at operation 54, the state of the presence of the host computer may be continually or periodically monitored to determine if the host computer is disconnected from the USB bus, in which case control may be returned to operation 48 of FIG. 3, in one example.

FIG. 5 illustrates an example of logical operations which may be performed by the local host when a host computer is not detected on the USB bus. At operation 60, the local host may acquire data about the hub and the attached peripherals. In one example where the local host is coupled to the upstream port of the hub, the local host may enumerate the hub so as to determine how many ports are associated with the hub, and obtain information from the hub as to how many devices are connected with the hub. The local host may also enable ports of the hub and enumerate each device connected to ports of the hub. In another example where the local host is coupled to the downstream ports of the hub, the local host may communicate directly with the peripheral devices attached to the downstream ports of the hub.

At operation 62, the local host communicates with and/or between the peripherals so as to pass data or information between the peripheral devices. In one example, the local host is configured to support particular peripheral devices and provided specific features, for example the local host may be adapted to support communications between a digital camera and a printer, or a flash media card reader and a printer, or other peripheral devices which in combination may provide useful functions to a user. In this example, the local host may act as a host for the peripherals. In another example, the local host may behave as a communications link or bridge so as to facilitate "on the go" (OTG) communications between the peripherals, where the peripherals have OTG capabilities.

At operation 64, the state of the non-presence of the host computer is continually or periodically monitored so that if a host computer is coupled to the upstream port of the hub, then control may be returned to operation 46, in one example.

Figure 6:
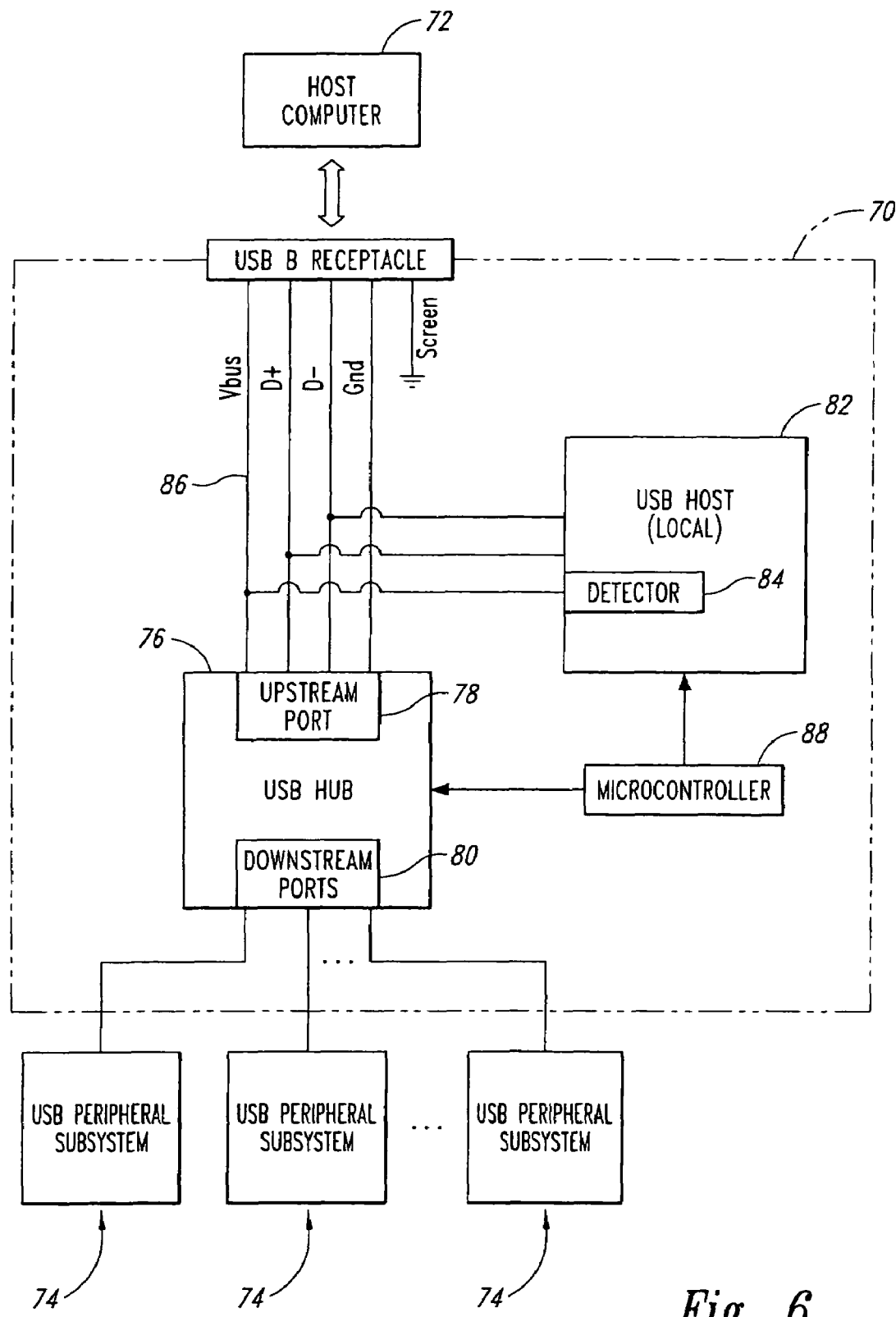
FIG. 6 illustrates a block diagram of one example of an apparatus for dynamically providing hub or host capabilities, in accordance with one embodiment of the present invention.

Referring now to FIG. 6, one example of an apparatus 70 for coupling a host computer 72 to a plurality of peripherals 74 is shown, in accordance with one embodiment of the present invention. In this example, the apparatus 70 includes a hub 76 having an upstream port 78 adapted to be coupled with the host computer 72 and downstream ports 80 adapted to be coupled with the peripherals 74. A local host 82 is coupled with the upstream port 78 of hub 76, and local host 82 includes a detector 84 for detecting the presence or absence of host computer 72 on the upstream port 78. The upstream port 78 may include a Vbus line 86, and the detector 84 may include a voltage detector detecting a voltage level on the Vbus line 86. For example, the detector 84 may detect a high voltage signal level for example in the range of approximately 4.35 to 5.25 volts as a condition indicating that the host computer 72 is coupled with the upstream port 78, and a low voltage signal level in the range of approximately 0 volts as a condition indicating that the host computer 72 is not coupled with the upstream port 78.

In operation, when detector 84 detects the presence of host computer 72 coupled with upstream port 78, local host 82 places its connections to upstream port 78 in a high impedance state so as to effectively disconnect from the upstream port 78, thereby allowing host computer 72 to drive and control the upstream port 78 and communicate with the peripheral 74 through the hub 76. In this example, the local host 82 may enter a lower power mode if desired.

When detector 84 detects the absence of host computer 72, the local host 82 drives and controls the upstream port 78 so that local host 82 communicates with peripherals 74 through hub 76, in this example.

A microcontroller 88 may be provided to facilitate communications between local host 82 and hub 76, in one embodiment. The microcontroller 88 may control the hub 76 when the host computer 72 is not coupled with the upstream port 78. For instance, the microcontroller 88 may configure the hub 76 to a enable repeating through all downstream ports 80 at all times. In this example, such arrangement would relieve the local host 82 of the need to enumerate each peripheral device 74 whenever the host computer 72 is removed, for example. In one example, the microcontroller 88 is coupled with the local host 82 using an interface which may be a standard interface such as a serial peripheral interface (SPI), an $I^2C$ bus, a parallel interface, a memory mapped interface, or other conventional interface. The microcontroller 88 may be coupled to the hub 76 using an interface which may be a standard interface such as a serial peripheral interface (SPI), an $I^2C$ bus, a parallel interface, a memory mapped interface, or other conventional interface.

The microcontroller 88 may also be specially adapted for use with particular peripherals 74—such as digital cameras and printers or other peripherals—such that the microcontroller 88 contains operations for facilitating communications between the peripherals 74 when the host computer 72 is not present. In one example, when the host computer 72 is not coupled with the upstream port 78, the microcontroller 88 performs one or more operations to permit data to be transferred from a first of the one or more peripheral devices 74 to a second of the one or more peripheral devices 74 through the local host 82 and hub 76. The microcontroller 88 may also configure hub 76 and local host 82 to act as a communication bridge between the peripheral devices 74 in order to enable communications between the devices 74.

In one embodiment, local host 82, microcontroller 88, and hub 76 are provided as a portion of or integrated within a single integrated circuit.

Figure 7:
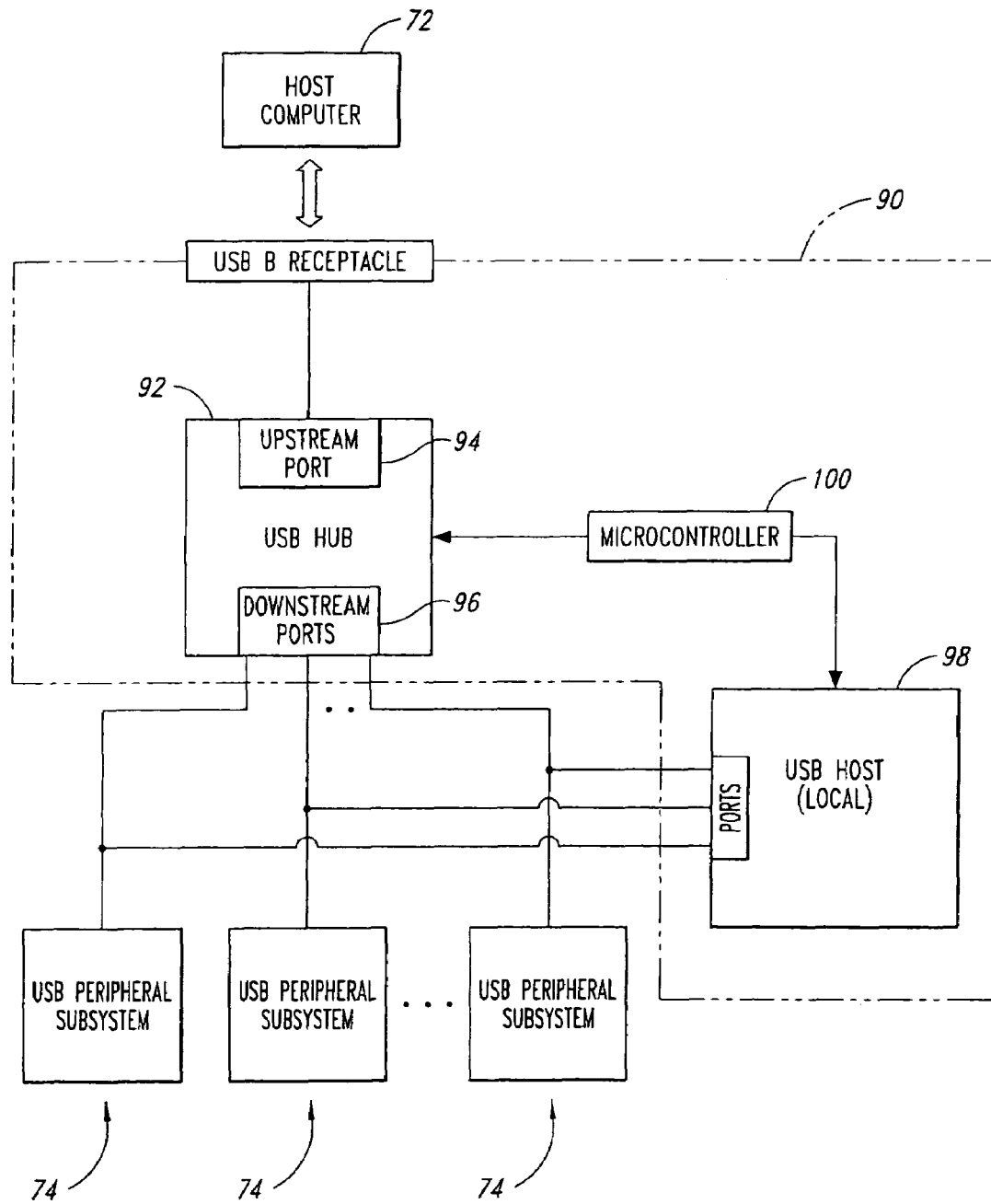
FIG. 7 illustrates a block diagram of another example of an apparatus for dynamically providing hub or host capabilities, in accordance with one embodiment of the present invention.

Referring now to FIG. 7, another example of an apparatus 90 for coupling a host computer 72 to a plurality of peripherals 74 is shown, in accordance with one embodiment of the present invention. In this example, the apparatus 90 includes a hub 92 having an upstream port 94 adapted to be coupled with the host computer 72 and downstream ports 96 adapted to be coupled with the peripherals 74. A local host 98 is coupled with the downstream ports 96 of hub 92, and local host 98 may include a plurality of USB serial interface engines (SIEs) in order to receive and process data from the peripheral devices coupled with the downstream ports 96. In this example, the hub 92 may determine and indicate whether the host computer 72 is coupled with the upstream port 94.

In operation, when the host computer 72 is detected as being coupled with the upstream port 94 of the hub 92, the local host 98 may disconnect from the downstream ports 96 by placing its connections to downstream port 96 in a high impedance state, thereby allowing host computer 72 to communicate with the peripheral 74 through the hub 92. In this example, the local host 98 may enter a lower power mode if desired.

When the host computer 72 is detected as not being coupled with the upstream port 94 of the hub 92, the local host 98 may be dynamically coupled with the downstream ports 96 to drives and controls the peripherals 74. In this example, the hub 96 may place its downstream ports 96 in a high impedance state and enter a low-power mode.

A microcontroller 100 may be provided between local host 98 and hub 92, in one embodiment. The microcontroller 100 may control the hub 92 when the host computer 72 is not coupled with the upstream port 94. For instance, the microcontroller 100 may configure the hub 92 to place its downstream ports in a high-impedance state.

In one example, the microcontroller 100 is coupled with the local host 98 using an interface which may be a standard interface such as a serial peripheral interface (SPI), an I²C bus, a parallel interface, a memory mapped interface, or other conventional interface. The microcontroller 100 may be coupled to the hub 92 using an interface which may be a standard interface such as a serial peripheral interface (SPI), an I²C bus, a parallel interface, a memory mapped interface, or other conventional interface.

The microcontroller 100 may also be specially adapted for use with particular peripherals 74—such as digital cameras and printers or other peripherals—such that the microcontroller 100 contains operations for facilitating communications between the peripherals 74 when the host computer 72 is not present. In one example, when the host computer 72 is not coupled with the upstream port 94, the microcontroller 100 performs one or more operations to permit data to be transferred from a first of the one or more peripheral devices 74 to a second of the one or more peripheral devices 74 through the local host 98. The microcontroller 100 may also configure local host 98 to act as a communication bridge between the peripheral devices 74 in order to enable communications between the devices 74.

In one embodiment, local host 98, microcontroller 100, and hub 92 are provided as a portion of or integrated within a single integrated circuit.

Accordingly, it can be seen that various embodiment of the present invention provided for, on a dynamic basis, communications between a host computer and peripherals, or communications between peripherals.

While blocks 88 and 100 have been shown and described as a microcontroller, it is understood that a microprocessor, programmable logic, logic, or other electrical circuit may be used in place of a microcontroller depending upon the particular implementation.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to a preferred embodiment thereof, it will be understood by those skilled in the art that various other changes in the form and details may be made without departing from the spirit and scope of the invention.

I claim:

1. An apparatus comprising:
   a hub having an upstream port for coupling with a host and one or more downstream ports for coupling with one or more peripheral devices; and
   a local host configurable to be dynamically decoupled from said upstream port when the host is coupled to the upstream port, the local host further configurable to operate in a low-power mode and monitor the upstream port when the host is coupled to the upstream port,
   the local host further configurable to allow data from at least one of the one or more peripheral devices to be transferred through the local host when the host is not coupled to the upstream port.

2. The apparatus of claim 1, wherein said local host includes a detector to monitor the upstream port to determine whether the host is coupled with said upstream port, and wherein said local host is further configurable to communicate with the one or more peripheral devices when the host is not coupled with the upstream port.

3. The apparatus of claim 2, wherein the upstream port includes a Vbus line, and the detector includes a voltage detector configurable to detect a voltage level on the Vbus line.

4. The apparatus of claim 3, wherein the voltage detector detects a high signal voltage level as a condition indicating that the host is coupled with the upstream port.

5. The apparatus of claim 1, wherein when the host is coupled with the upstream port, the local host is configurable to communicate with the one or more peripheral devices through the hub.

6. The apparatus of claim 1, further comprising:
   a microcontroller coupled with the local host and the hub, said microcontroller configurable to control the hub when the host is not coupled with the upstream port.

7. The apparatus of claim 6, wherein when the host is not coupled with the upstream port, the microcontroller performs one or more operations to permit the data from the at least one of the one or more peripheral devices to be transferred from the at least one of the one or more peripheral devices to another of said one or more peripheral devices.

8. The apparatus of claim 1, wherein the local host comprises a plurality of serial interface engines configurable to receive and process data from the one or more peripheral devices when the host is not coupled with the upstream port.

9. An apparatus comprising:
   a hub having an upstream port for coupling with a host and one or more downstream ports for coupling with one or more peripherals;
   a local host configurable to be dynamically coupled with said downstream ports when the host is not coupled with the upstream port and, dynamically decoupled from said upstream downstream ports when the host is coupled with the upstream port; and a microcontroller coupled with the local host and coupled with the hub, the microcontroller configurable to control the hub when the host is not coupled with the upstream port.

10. The apparatus of claim 9, wherein the hub is configurable to determine and indicate whether the host is coupled with said upstream port, and wherein said local host is further configurable to receive an indication from the hub whether the host is coupled with said upstream port and, when the host is not coupled with the upstream port, communicate with at least one peripheral of the one or more peripherals.

11. The apparatus of claim 10, wherein the local host is further configurable to communicate with the at least one peripheral at least in part by utilizing a plurality of serial interface engines of the local host to receive and process data from the at least one peripheral.

12. The apparatus of claim 9, wherein when the host is coupled with the upstream port, the local host is configurable to be in a low-power mode.

13. The apparatus of claim 9, wherein when the host is not coupled with the upstream port, the microcontroller configurable to perform one or more operations to permit data to be transferred from a first of said one or more peripheral devices to a second of said one or more peripheral devices through the local host.

14. A method comprising:
  detecting a host device coupled to an upstream port of a universal serial bus (USB) hub, wherein one or more peripheral devices are coupled to a plurality of downstream ports of the USB hub; and
  responsive to detecting the host device coupled to the upstream port, dynamically configuring a local host so that the host device communicates with one or more peripheral devices through the USB hub, wherein said dynamically configuring comprises decoupling the local host from the upstream port or from the plurality of downstream ports; and
  responsive to detecting the host device coupled to the upstream port, further dynamically configuring the local host to operate in a low-power mode and monitor the upstream port for a status change associated with the host device coupled to the upstream port.

15. The method of claim 14, further comprising:
  detecting the host device is not coupled to the upstream port;
  responsive to detecting the host device is not coupled to the upstream port, further dynamically configuring the local host so that the local host communicates with the one or more peripheral devices through the USB hub.

16. The method of claim 15, wherein the local host communicates with the peripherals at least in part by utilizing a plurality of serial interface engines of the local host to receive and process data from the one or more peripheral devices.

17. The method of claim 14, further comprising:
  providing a microcontroller coupled with the local host and the USB hub for controlling the hub when the host is not present.

18. The method of claim 14,
  detecting the host device is not coupled to the upstream port;
  responsive to detecting the host device is not coupled to the upstream port, transferring data from a first of said one or more peripheral devices to a second of said one or more peripheral devices through the local host.

* * * * *